US011113752B2

(12) United States Patent
Kong

(10) Patent No.: US 11,113,752 B2
(45) Date of Patent: *Sep. 7, 2021

(54) ON-LINE SESSION TRACE SYSTEM

(71) Applicant: eBay Inc., San Jose, CA (US)

(72) Inventor: Rui Kong, Lake Oswego, OR (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,235

(22) Filed: Apr. 27, 2020

(65) Prior Publication Data
US 2020/0402142 A1 Dec. 24, 2020

Related U.S. Application Data

(63) Continuation of application No. 14/941,766, filed on Nov. 16, 2015, now Pat. No. 10,672,064.

(51) Int. Cl.
G06Q 30/00 (2012.01)
G06Q 30/06 (2012.01)
H04L 29/08 (2006.01)
G06Q 30/02 (2012.01)

(52) U.S. Cl.
CPC ..... *G06Q 30/0641* (2013.01); *G06Q 30/0282* (2013.01); *H04L 67/02* (2013.01); *H04L 67/22* (2013.01)

(58) Field of Classification Search
None
See application file for complete search history.

(56) References Cited

U.S. PATENT DOCUMENTS

| 6,810,247 | B1 | 10/2004 | Halpern |
| 8,302,011 | B2 | 10/2012 | Bryar et al. |
| 9,549,028 | B2 | 1/2017 | Sundaresan |
| 10,672,064 | B2 | 6/2020 | Kong |
| 2003/0154289 | A1 | 8/2003 | Williamson et al. |
| 2003/0233361 | A1* | 12/2003 | Cady ............... H04L 67/14 |
| 2005/0278231 | A1 | 12/2005 | Teeter |
| 2006/0059225 | A1 | 3/2006 | Stonehocker et al. |
| 2011/0296038 | A1 | 12/2011 | Mandre |
| 2013/0055078 | A1 | 2/2013 | Berger et al. |
| 2013/0110624 | A1 | 5/2013 | Mitrovic |
| 2013/0283145 | A1 | 10/2013 | Argent |
| 2014/0095326 | A1 | 4/2014 | Adam |

(Continued)

OTHER PUBLICATIONS

U.S. Appl. No. 14/941,766, now U.S. Pat. No. 10,672,064, filed Nov. 16, 2015, On-Line Session Trace System.

(Continued)

*Primary Examiner* — Mila Airapetian
(74) *Attorney, Agent, or Firm* — Schwegman Lundberg & Woessner, P.A.

(57) ABSTRACT

In various example embodiments, a system and method for enhancing a user's on-line experience by utilizing a computer-implemented on-line session trace system is provided. The on-line session trace system is provided in connection with an on-line trading platform. The on-line session trace system records and stores a state of an on-line session associated with a user identification and permits a user associated with the user identification to commence a further on-line session from a state corresponding to the saved state of a previous on-line session.

20 Claims, 5 Drawing Sheets

(56) References Cited

U.S. PATENT DOCUMENTS

| | | |
|---|---|---|
| 2014/0222503 A1 | 8/2014 | Vijayaraghavan et al. |
| 2014/0337709 A1 | 11/2014 | Choi |
| 2015/0177934 A1 | 6/2015 | Carrillo et al. |
| 2015/0294349 A1 | 10/2015 | Capel et al. |
| 2016/0239867 A1 | 8/2016 | Sinha et al. |
| 2016/0314494 A1 | 10/2016 | Dhawan et al. |
| 2017/0140456 A1 | 5/2017 | Kong |
| 2017/0148046 A1 | 5/2017 | Akbarpour Mashadi et al. |

OTHER PUBLICATIONS

Final Office Action Received for U.S. Appl. No. 14/941,766 dated Jan. 11, 2019, 12 pages.

Final Office Action received for U.S. Appl. No. 14/941,766, dated Oct. 19, 2018, 12 pages.

Final Office Action received for U.S. Appl. No. 14/941,766, dated Sep. 17, 2019, 15 Pages.

Non-Final Office Action received for U.S. Appl. No. 14/941,766, dated Mar. 29, 2018, 12 pages.

Non-Final Office action received for U.S. Appl. No. 14/941,766, dated Apr. 25, 2019, 12 pages.

Notice of Allowance received for U.S. Appl. No. 14/941,766, dated Jan. 23, 2020, 9 Pages.

Response to Final Office Action filed on Dec. 19, 2018, for U.S. Appl. No. 14/941,766, dated Oct. 19, 2018, 8 pages.

Response to Final Office Action filed on Mar. 11, 2019 for U.S. Appl. No. 14/941,766 dated Jan. 11, 2019, 11 pages.

Response to Final Office Action filed on Nov. 26, 2019 for U.S. Appl. No. 14/941,766, dated Sep. 17, 2019, 11 pages.

Response to Non-Final Office Action filed on Jul. 19, 2019 for U.S. Appl. No. 14/941,766, dated Apr. 25, 2019, 11 pages.

Response to Non-Final Office Action filed on Jun. 28, 2018, for U.S. Appl. No. 14/941,766, dated Mar. 29, 2018, 10 pages.

\* cited by examiner

ON-LINE SESSION TRACE SYSTEM

CROSS-REFERENCE TO RELATED APPLICATION

This application is a continuation of U.S. patent application Ser. No. 14/941,766, filed Nov. 16, 2015, which application and publication are incorporated herein by reference in their entirety.

TECHNICAL FIELD

Embodiments of the present disclosure relate generally to data processing and, more particularly, but not by way of limitation, to enhancing a user's on-line experience by utilizing on-line session trace system.

BACKGROUND

An on-line trading platform allows users to shop for almost anything using, for example, a web browser application or an application native to a mobile device. An electronic publication related to goods and/or services being offered for sale may be termed an item listing. A user may find an item listed by an on-line trading application by entering keywords into the search box provided on an associated web page or by browsing through the list of categories on the home page. After reading an item description and viewing a seller's reputation, the user is able to either place a bid on the item or purchase it instantly.

BRIEF DESCRIPTION OF THE DRAWINGS

Various ones of the appended drawings merely illustrate example embodiments of the present disclosure and cannot be considered as limiting its scope.

Figure 1:
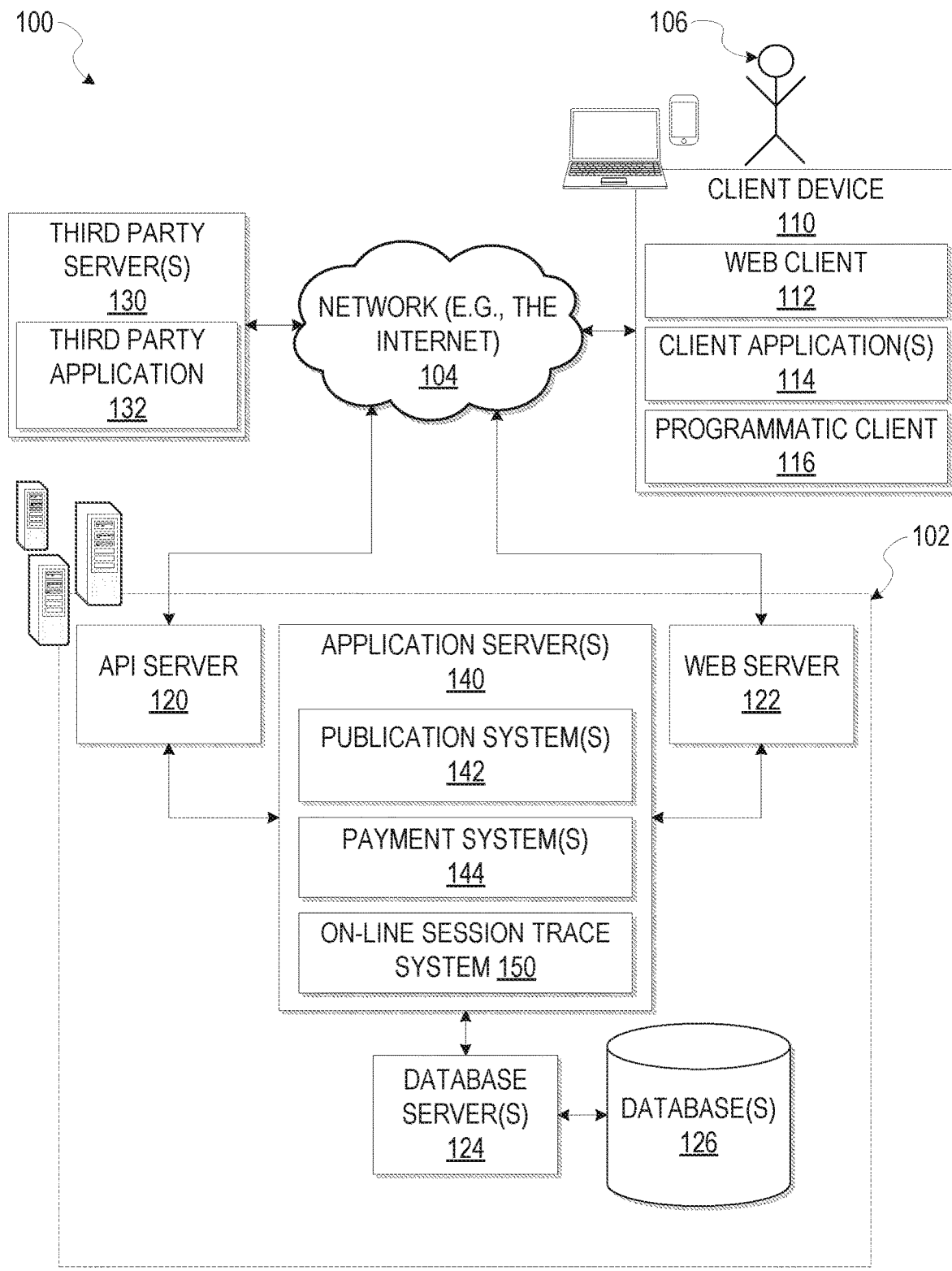
FIG. 1 is a diagrammatic representation of a network environment within which an example method and system that utilizes a shopping trace may be implemented.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As on-line shopping services offer increasingly greater and greater number of features and experiences, such as assisted intuitive searching for products, presentation of extensive information about the searched-for products, as well as access to other users' reviews and evaluations of products, the process of shopping on-line even for a single item may be a time consuming process. For example, in response to requesting a search with a single search term "backpack," the user may be taken on a journey where an on-line shopping system presents various categories of backpacks, permitting the user to limit their search to, say, daypacks, such that other types of backpacks (e.g., school bags, or high capacity backpacking packs) are excluded from the search results. Even when a specific category of the searched-for item has been identified, the user may still engage in a rather involved process of reading reviews of various products submitted by other users, of which they would like to choose the one most appropriate for them. A user, who is engaged in an on-line shopping experience, may choose to interrupt their shopping flow at any point in the process, with an intension to resume it again, at a later time.

A system and method are provided to enhance a user's on-line experience (e.g., on-line shopping experience) by preserving the state of an on-line session (e.g., an on-line shopping session) at the time a user leaves an incomplete shopping process and permitting the user to resume the shopping session from the state where they left it, upon restarting the shopping session. Such system may be referred to as an on-line session trace system. An on-line session trace system may be configured to record a so-called trace of a customer shopping session that includes a recording of multiple trace attributes. The trace attributes may indicate, for example, a latest shopping state or characteristics of a client device that was used to access an on-line shopping platform during a subject shopping session associated with a user identification. The user identification may represent, e.g., a user account, a browser fingerprint, etc.

In one scenario, one of the trace attributes may indicate that the user was reading a long page of review comments, and that the subject shopping session ended when the user was at a certain place on a product reviews page. The on-line session trace system detects the mouse location and a focus area at a client device that is being used by the user to access an on-line trading platform, record a line number and a paragraph number and how many reviews have been read, and store this information in a latest shopping state attribute. When the user returns, meaning when a further shopping session is initiated for the same user account, the on-line session trace system accesses the latest shopping state attribute and, based on the latest shopping state attribute, loads and sets the view focus to that specific line in that specific paragraph.

In another scenario, a trace attribute may indicate a landing page that was last accessed by the user during the subject shopping session. For example, the user may have left the subject shopping session while reading customer reviews (as in the scenario described above), or after having reached the check-out page, or in the middle of viewing search results provided in response to a certain query. The trace attribute that indicates a landing page that was last accessed by the user during the subject shopping session may be termed the latest shopping state attribute and may include an identification of such landing page so that a further shopping session commences for the same user would start on that landing page.

In some embodiments, the on-line session trace system can detect a type of the display device being used by the user to access the on-line trading platform (e.g., a larger size desktop monitor, a tablet, a smaller screen of a mobile device) and present the landing page that was determined based on the latest shopping state attribute persisted from the subject shopping session, in accordance with the detected current type of the display device. For example, the landing page may be presented on a smaller screen such that the visible portion of the landing page includes the area of the view focus that can be indicated by one of the trace attributes persisted from the subject shopping session.

In some embodiments, the on-line session trace system can persist states from two or more previous on-line sessions for a user identification and, when a further on-line session is initiated for the same user identification, the on-line session trace system may present the user with an option to select which one of the earlier shopping sessions to resumed. For example, one of the earlier shopping sessions included a search for backpacks where a user went through multiple search paths eliminating camping gear and school bags and stopping at a product reviews page that presents user reviews of day packs. Another one of the earlier shopping sessions may have been for a particular book where the user selected the book and a seller and terminated the shopping session while accessing a check-out page but before having completed the order. The on-line session trace system can present the user with an option to select either one of those shopping sessions and, based on the user's selection, present either the product reviews page that presents user reviews of day packs or the check-out page that has information the user previously entered or selected with respect to ordering the book. In yet another scenario, where a user went through multiple search paths (e.g., as in the example above where the user eliminated school bags and also large backpack that are commonly used for backpacking trips) the on-line session trace system presents the user with a reminder that she has already examined certain categories of search results and may now instruct the search engine to not include items from those categories in the further search results.

In some embodiments, an on-line session trace system may cooperate with a geo-location component of the associated on-line trading platform. The on-line trading platform may detect that a mobile device executing a mobile app for accessing the on-line trading platform is located at a certain retail store, which is then treated as an indication that the user has arrived at that store. The on-line session trace system then accesses the trace attributes from the trace recorded for a subject shopping session for a user account associated with the mobile device and sends to the mobile device a text message, a targeted promotion, or notification, based on the trace attributes. For example, while shopping on-line using the on-line trading platform, a user may have searched for backpacks and actually narrowed down the search to a specific type of backpack. When that user arrives at a store, the on-line trading platform detects, based on geo-location information obtained from the user's mobile device that the user is at a brick and mortar store that sells that specific type of backpack and, for example, that the store has that specific type of backpack in stock. The on-line trading platform can then send to the user's mobile device a notification or a coupon related to that type of backpack or to some other related product. An example shopping trace system may be implemented in the context of a network environment illustrated in FIG. 1.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110, and may be referred to as an on-line trading platform 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user may utilize to access the on-line trading platform 102. In some embodiments, the client device 110 comprises a display module (not shown) to display information (e.g., in the form of user interfaces). In further embodiments, the client device 110 comprises one or more of a touch screens, accelerometers, gyroscopes, cameras, microphones, global positioning system (GPS) devices, and so forth. The client device 110 may be a device of a user that is used to perform a transaction involving items within the on-line trading platform 102. In one embodiment, the on-line trading platform 102 is a network-based publication system that responds to requests for product listings, publishes electronic publications comprising item listings of products available on the network-based publication system, and manages payments for these transactions.

One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the on-line trading platform 102, on an as needed basis, for data or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the on-line trading platform 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the on-line trading platform 102 via the network 104. In this instance, the on-line trading platform 102, in response to receiving the input from the user, communicates information to the client device 110 via the network 104 to be presented to the user. In this way, the user can interact with the on-line trading platform 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

Additionally, a third party application 132, executing on third party server(s) 130, is shown as having programmatic access to the on-line trading platform 102 via the programmatic interface provided by the API server 120. For example, the third party application 132, utilizing information retrieved from the on-line trading platform 102, supports one or more features or functions on a website hosted by the third party. The third party website, for example, provides one or more promotional, marketplace, or payment functions that are supported by the relevant applications of the on-line trading platform 102.

The publication systems 142 provide a number of publication functions and services to users 106 that access the on-line trading platform 102. The payment systems 144 likewise provide a number of functions to perform or facilitate payments and transactions. While the publication system 142 and payment system 144 are shown in FIG. 1 to both form part of the on-line trading platform 102, it will be appreciated that, in alternative embodiments, each system 142 and 144 may form part of a payment service that is separate and distinct from the on-line trading platform 102. In some embodiments, the payment systems 144 may form part of the publication system 142.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the on-line trading platform 102 in an off-line manner, and to perform batch-mode communications between the programmatic client 116 and the on-line trading platform 102.

The application servers 140 also hosts an on-line session trace system 150. The on-line session trace system 150, in one example embodiment, is configured to monitor and store certain decision data collected during a shopping session of a user, who may be accessing the on-line trading platform 102 via the client device 110. Such decision data may include, for instance, a selection of one category associated with a search term over other categories. For example, a search term that a user entered at the beginning of a shopping session may be "carpet," and the events detected as the session progressed indicated that the user is not interested in automobile carpets or wall-to-wall carpeting, but is only interested in area rugs. The on-line session trace system 150 records this information as being associated with the subject shopping session and presents only items associated with an area rugs category when a further shopping session is initiated for the same user identification.

Furthermore, the on-line session trace system 150 may record a specific stage within a subject shopping session, such as, for example, a stage where the user interacts with a shopping cart web page (also referred to as merely a "shopping cart"), and commence a further shopping session at a later time at the state where the user has left the shopping cart. Another stage, at which a user may have left a subject shopping session, is a customer reviews reading stage. When a further shopping session is commenced at a later time (e.g., after the user explicitly logged out or was inactive for longer than a predetermined period of time, after which the session is automatically terminated), the on-line session trace system 150 may present the user with a landing page corresponding to the review the user had been viewing on a customer reviews web page at the time the session had been terminated or interrupted.

The on-line session trace system 150 may also present a user with an option to select a particular landing page representing a specific stage within the subject shopping session stage, or to choose from one of multiple previous shopping sessions. For example, continuing with the scenario described above, a user may be presented with an option of whether to continue shopping for area rugs or to explore another category associated with the term "carpet."

The on-line session trace system 150 may also be used in conjunction with a geo-location component of the on-line trading platform 102, as described above. In some example embodiments, the on-line session trace system 150 may communicate with the publication systems 142 (e.g., accessing item listings) and payment system 144. In an alternative embodiment, the on-line session trace system 150 may be a part of the publication system 120.

It will be noted that, while the client-server-based network architecture 100 shown in FIG. 1 employs a client-server architecture, the present inventive subject matter is of course not limited to such an architecture, and could equally well find application in a distributed, or peer-to-peer, architecture system, for example. The publication system 142, payment system 144, and on-line session trace system 150 can also be implemented as standalone software programs. In some embodiments, the on-line session trace system 150 may be implemented as part of the publication system 142. An example on-line session trace system 150 is described below, with reference to FIG. 2.

Figure 2:
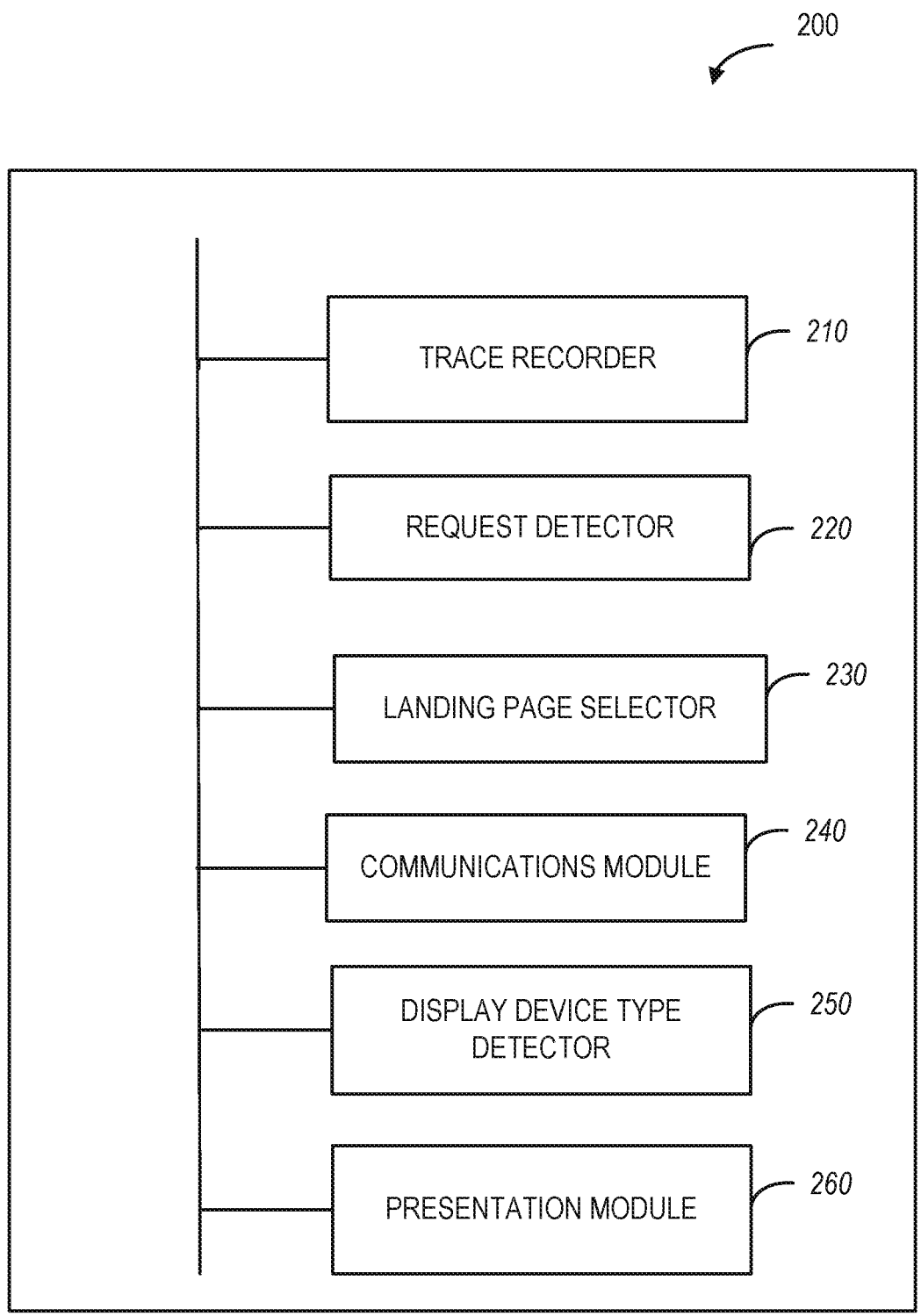
FIG. 2 is block diagram of a system that utilizes a shopping trace, in accordance with one example embodiment.

FIG. 2 is a block diagram of a system 200, also referred to as the on-line session trace system 150, in accordance with one example embodiment. As shown in FIG. 2, the system 200 includes a trace recorder 210, a request detector 220, a landing page selector 230, and a communications module 240.

The trace recorder 210 is configured to record a trace of a customer shopping in a course of a subject shopping session associated with a user identification. The trace of customer shopping includes one or more trace attributes. The trace attributes are used by the landing page selector 230 to select a landing page related to the subject shopping session.

The trace attributes are also used, for example, by the communications module 240, to determine a paragraph and a line number in a review on a customer reviews page in a scenario where the landing page is a customer reviews page provided by the on-line trading platform 102 of FIG. 1.

The trace attributes are also used, for example, by the communications module 240, to determine those reviews on the customer reviews page that have been accessed. The communications module 240 may be configured to modify the landing page to indicate that those reviews have been accessed prior to the serving of the landing page to the client device and to serve the landing page to the client device 110 of FIG. 1. In one embodiment, the communications module 240 is configured to set a view focus to the paragraph and the line number in the review.

The request detector 220 is configured to detect a request from the client device 110 to commence a further shopping session associated with the same user identification as the one associated with the subject shopping session. The landing page selector 230 is configured to select a landing page related to the subject shopping session based on the one or more trace attributes.

Also shown in FIG. 2 is a display device type detector 250. The display device type detector 250 is configured to detect a type of a display device being used to access the on-line trading platform 102 during a shopping session and to cause presentation of the landing page on the client device 110 according to the detected current type of the display device.

Another module shown in FIG. 2 is a presentation module 260. The presentation module 260 is configured to cause presentation, on a display device of the client device 110, of an option to select one from the plurality of earlier shopping sessions in response to the request to commence the further shopping session subsequent to two or more of earlier shopping sessions associated with the same user identification. The presentation module 260 selects the subject shopping session based on a user selection from the plurality of earlier shopping sessions, such that various modules of the system 200 use the trace attributes recorded in the course of the subject shopping session (e.g., to determine a landing page for the further shopping session).

In some embodiments, the system 200 may cooperate with a geo-location system that may be provided with or as part of the on-line trading platform 102. A request, from a client device, to commence a further shopping session may be associated with detecting, based on geo-location information obtained by the client device 110, commencement of an in-store experience associated with the user identification. Upon such request, and responsive to determining that the geo-location information obtained by the client device 110 indicates that a user associated with a particular user identification is physically in a store that sells one or more products reflected in a trace recorded for a subject shopping session associated with that user identification, the communications module 240 communicates promotion information or some other notification to the client device 110. Example operations performed by the on-line session trace system 200 are described with reference to FIG. 3.

Figure 3:
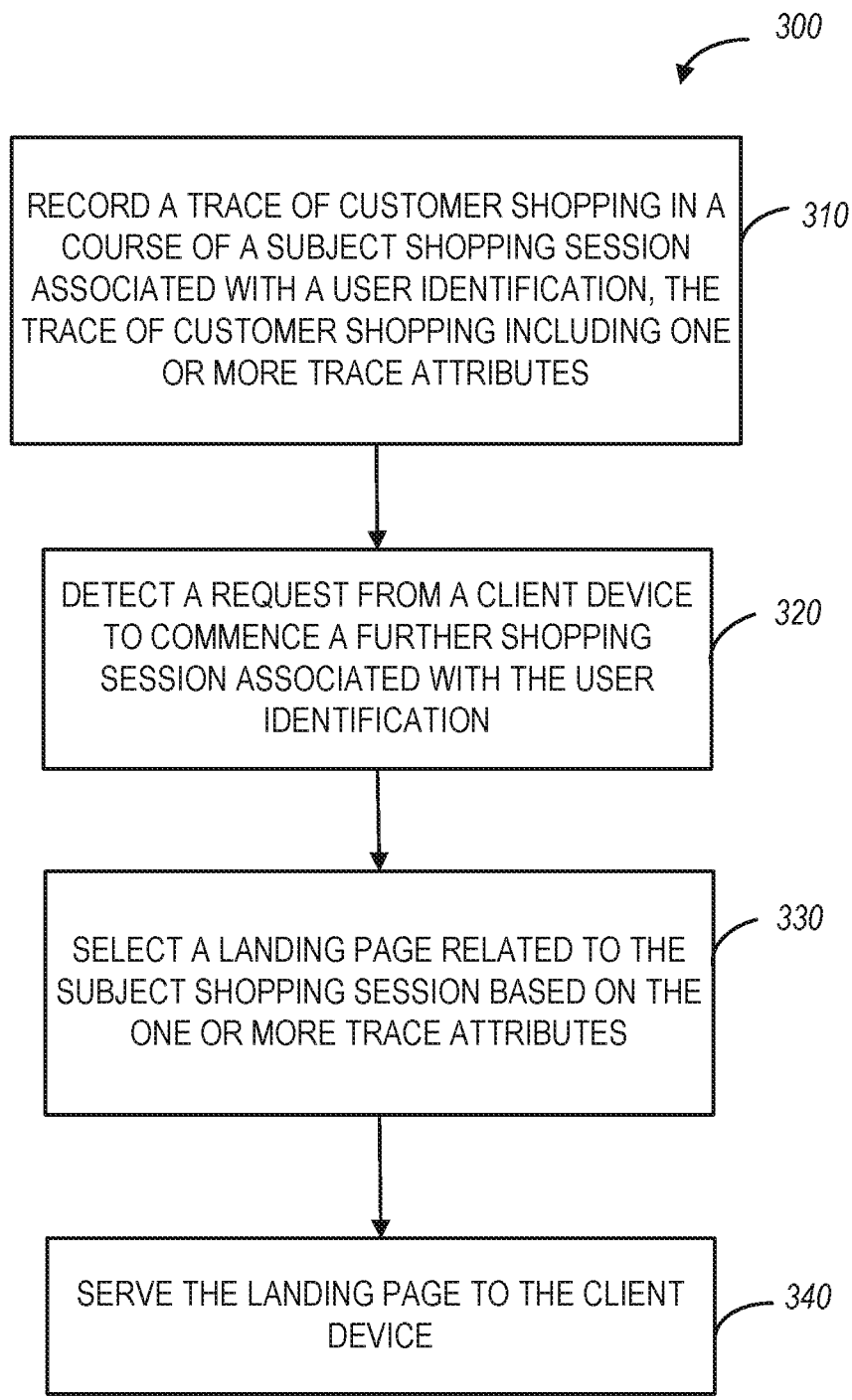
FIG. 3 is a flow chart of a method that utilizes a shopping trace, in accordance with an example embodiment.

FIG. 3 is a flow chart of a method 300 that utilizes the on-line session trace system 150, according to one example embodiment. The method 300 is performed by processing logic that may comprise hardware (e.g., dedicated logic, programmable logic, microcode, etc.), software (such as run on a general purpose computer system or a dedicated machine), or a combination of both. In one example embodiment, the processing logic resides at the application servers 140 of FIG. 1 and, in particular, the on-line session trace system 150.

As shown in FIG. 3, the method 300 commences at operation 310, when the trace recorder 210 of FIG. 2 records a trace of customer shopping in a course of a subject shopping session associated with a user identification. As explained above, the trace of customer shopping includes one or more trace attributes, which are later used, for example, to select a landing page related to the subject shopping session, to determine a paragraph and a line number in a review on a customer reviews page in a scenario where the landing page is a customer reviews page, to determine those reviews on the customer reviews page that have been accessed, etc.

At operation 320, the request detector 220 of FIG. 2 detects a request from the client device 110 of FIG. 1 to commence a further shopping session associated with the same user identification as the one associated with the subject shopping session.

At operation 330, the landing page selector 230 selects a landing page related to the subject shopping session based on the one or more trace attributes.

The communications module 240 serves of the landing page to the client device 110 at operation 340.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-3 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 4:
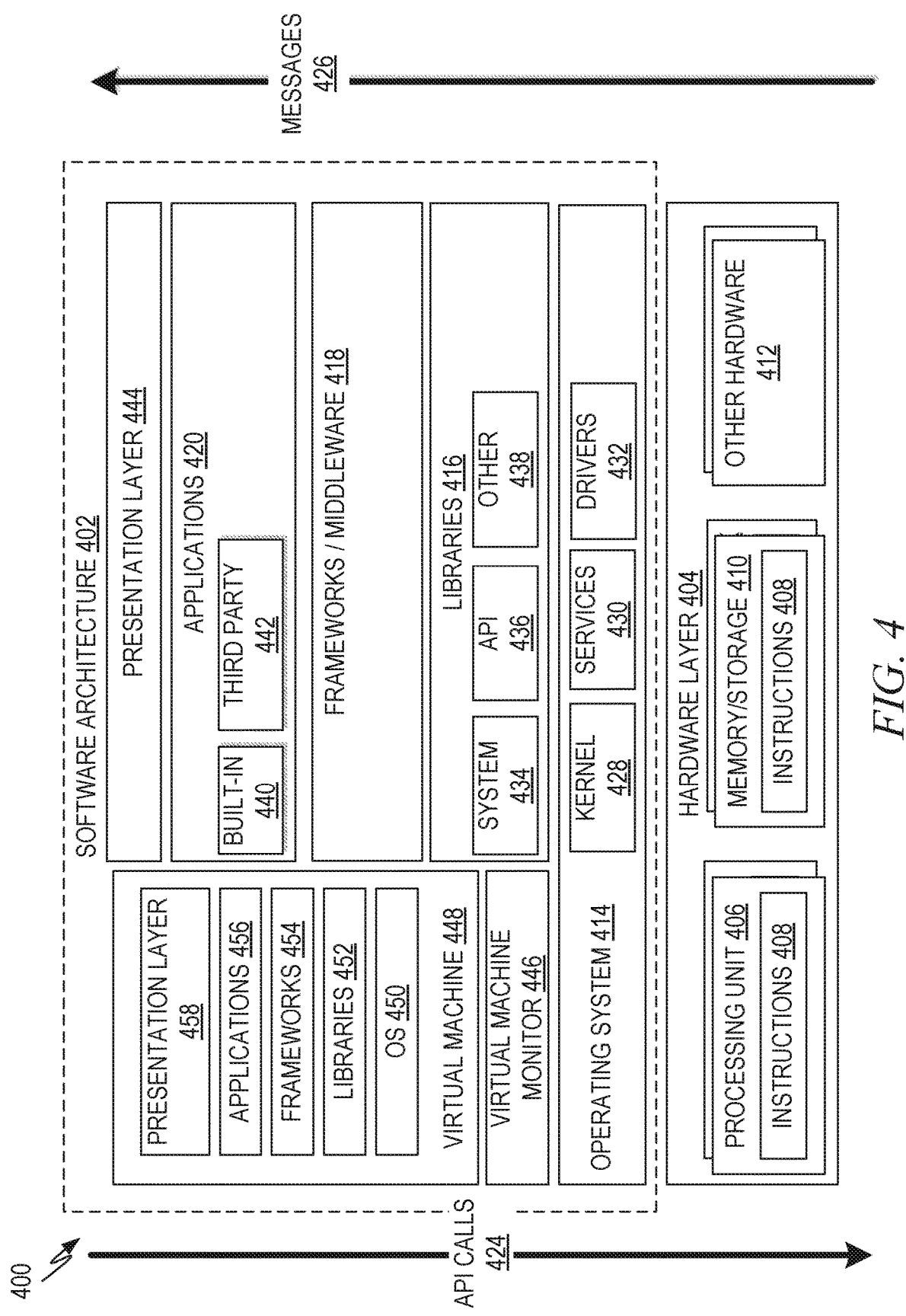
FIG. 4 is a block diagram illustrating an example of a software architecture that may be installed on a machine, according to some example embodiments.

FIG. 4 is a block diagram 400 illustrating a representative software architecture 402, which may be used in conjunction with various hardware architectures herein described. FIG. 4 is merely a non-limiting example of a software architecture and it will be appreciated that many other architectures may be implemented to facilitate the functionality described herein. The software architecture 402 may be executing on hardware such as machine 500 of FIG. 5 that includes, among other things, processors 510, memory 530, and I/O components 550. A representative hardware layer 404 is illustrated and can represent, for example, the machine 500 of FIG. 5. The representative hardware layer 404 comprises one or more processing units 406 having associated executable instructions 408. Executable instructions 408 represent the executable instructions of the software architecture 402, including implementation of the methods, modules and so forth of FIGS. 1-3. Hardware layer 404 also includes memory or storage modules 410, which also have executable instructions 408. Hardware layer 404 may also comprise other hardware as indicated by 412 which represents any other hardware of the hardware layer 404, such as the other hardware illustrated as part of machine 500.

In the example architecture of FIG. 4, the software 402 may be conceptualized as a stack of layers where each layer provides particular functionality. For example, the software 402 may include layers such as an operating system 414, libraries 416, frameworks/middleware 418, applications 420 and presentation layer 422. Operationally, the applications 420 or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be utilized by the applications 420 or other components and/or layers. The libraries 416 typically provide functionality that allows other software modules to perform tasks in an easier fashion than to interface directly with the underlying operating system 414 functionality (e.g., kernel 428, services 430, or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 or other software components/modules, some of which may be specific to a particular operating system or platform.

The applications 420 include built-in applications 440 or third party applications 442. Examples of representative built-in applications 440 may include, but are not limited to, a contacts application, a browser application, a book reader application, a location application, a media application, a messaging application, or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 442 may invoke the API calls 424 provided by the mobile operating system such as operating system 414 to facilitate functionality described herein.

The applications 420 may utilize built in operating system functions (e.g., kernel 428, services 430, or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware machine (such as the machine of FIG. 5, for example). A virtual machine is hosted by a host operating system (operating system 414 in FIG. 5) and typically, although not always, has a virtual machine monitor 446, which manages the operation of the virtual machine as well as the interface with the host operating system (e.g., operating system 414). A software architecture executes within the virtual machine such as an operating system 450, libraries 452, frameworks/middleware 454, applications 456, or presentation layer 458. These layers of software architecture executing within the virtual machine 448 can be the same as corresponding layers previously described or may be different.

Example Machine Architecture and Machine-Readable Medium

Figure 5:
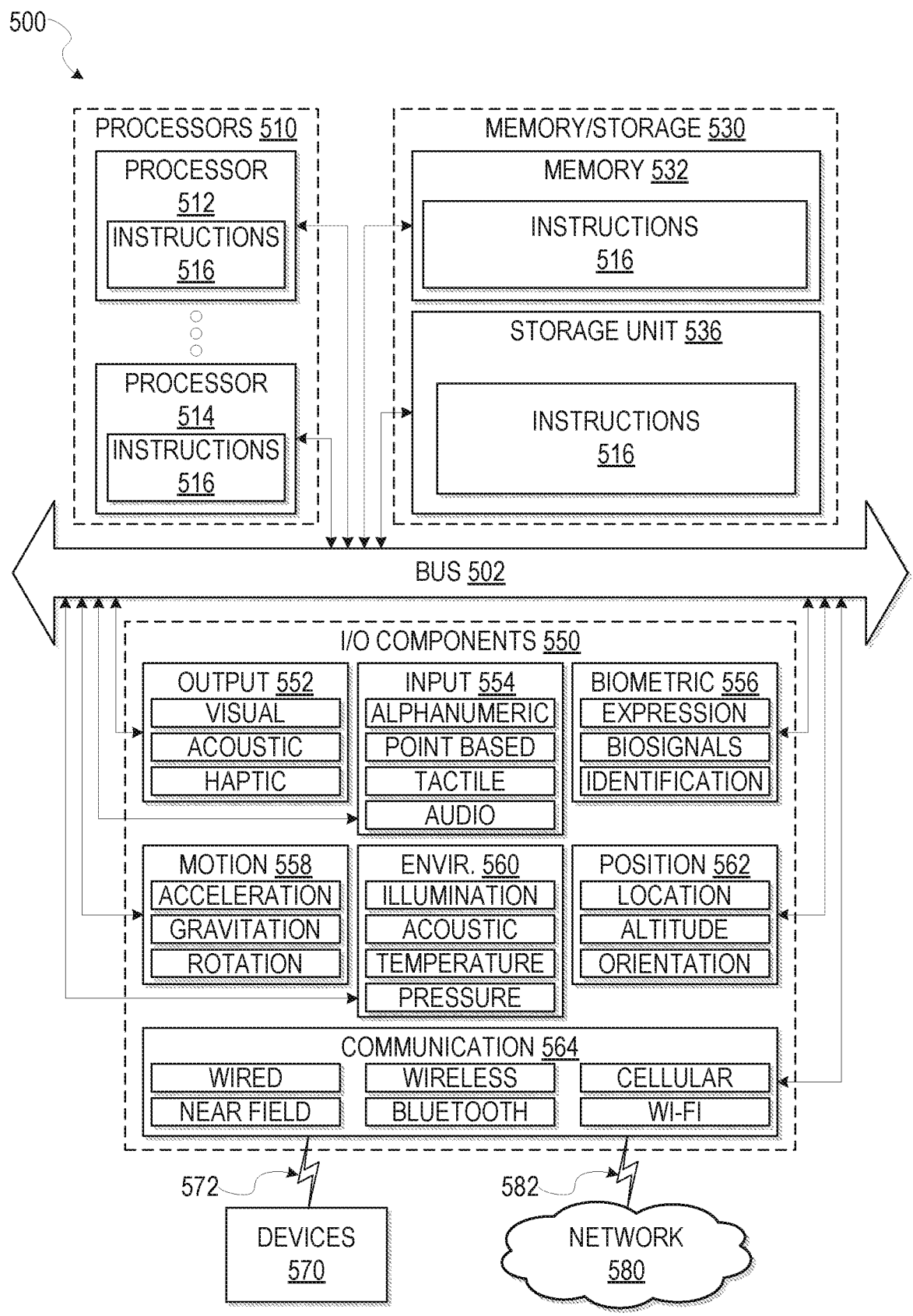
FIG. 5 illustrates a diagrammatic representation of a machine in the form of a computer system within which a set of instructions may be executed for causing the machine to perform any one or more of the methodologies discussed herein, according to an example embodiment.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions may cause the machine to execute the flow diagrams of FIG. 3. Additionally, or alternatively, the instructions may implement the modules illustrated in FIG. 2, and so forth. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500.

Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

recording, via at least one hardware processor, in a course of an on-line shopping session associated with a user identification, one or more trace attributes indicative of activities of a user during the on-line shopping session, the one or more trace attributes comprising an attribute indicating a shopping cart web page that was last accessed via the on-line shopping session;

detecting, via the at least one hardware processor, a request from a client device to commence a second on-line shopping session associated with the user identification; and subsequent to an interruption of the on-line shopping session and in response to the detected request to commence the second on-line shopping session:

selecting, via the at least one hardware processor, the shopping cart web page based on the attribute indicating the shopping cart web page was last accessed during the on-line shopping session, and causing display of the web page via the second on-line shopping session on the client device.

2. The method of claim 1, wherein the user identification uniquely identifies a particular user.

3. The method of claim 1, wherein the at least one hardware processor executes a web based service that configures the at least one hardware processor to perform the recording, detecting, selecting, and causing of the display.

4. The method of claim 1, further comprising:
detecting, via the second on-line shopping session, a type of a display device; and
causing presentation of the web page in accordance with the detected type of the display device.

5. The method of claim 1, further comprising recording one or more second trace attributes indicative of a focus area of the shopping cart web page, and setting, via the second on-line shopping session, a focus area of the shopping cart web page in accordance with the one or more second trace attributes.

6. The method of claim 1, further comprising:
recording, via the second on-line shopping session, one or more second trace attributes indicative of a paragraph and a line number in a review on a customer reviews page;
establishing a third on-line shopping session based on the user identification; and
in response to the establishing of the third on-line shopping session and the one or more second trace attributes, causing display of the customer reviews page with a view focus at the indicated paragraph and line number.

7. The method of claim 6, wherein the causing of the display of the customer reviews page comprises:
determining, from the one or more second trace attributes, reviews on the customer reviews page accessed by a prior session associated with the user identification; and
modifying the customer reviews page to indicate that those reviews are accessed.

8. The method of claim 6, further comprising:
receiving a request to establish the third on-line shopping session;
in response to the request, detecting the second on-line shopping session;
causing display, via the third on-line shopping session, of an option to select the second on-line shopping session; and
causing display of a web page based on a selection of the second on-line shopping session.

9. A system, comprising:
hardware processing circuitry;
one or more hardware memories storing instructions that when executed configure the hardware processing circuitry to perform operations comprising:
recording, via at least one hardware processor, in a course of an on-line shopping session associated with a user identification, one or more trace attributes indicative of activities of a user during the on-line shopping session, the one or more trace attributes comprising an attribute indicating a shopping cart web page that was last accessed via the on-line shopping session;

detecting, via the at least one hardware processor, a request from a client device to commence a second on-line shopping session associated with the user identification; and
subsequent to an interruption of the on-line shopping session and in response to the detected request to commence the second on-line shopping session:
selecting, via the at least one hardware processor, the shopping cart web page based on the attribute indicating the shopping cart web page that was last accessed during the on-line shopping session, and
causing display of the web page via the second on-line shopping session on the client device.

10. The system of claim 9, wherein the user identification uniquely identifies a particular user.

11. The system of claim 9, wherein the at least one hardware processor executes a web based service that configures the at least one hardware processor to perform the recording, detecting, selecting, and causing of the display.

12. The system of claim 9, the operations further comprising:
detecting, via the second on-line shopping session, a type of a display device; and
causing presentation of the web page in accordance with the detected type of the display device.

13. The system of claim 9, the operations further comprising recording one or more second trace attributes indicative of a focus area of the shopping cart web page, and setting, via the second on-line shopping session, a focus area of the shopping cart web page in accordance with the one or more second trace attributes.

14. The system of claim 9, the operations further comprising:
recording, via the second on-line shopping session, one or more second trace attributes indicative of a paragraph and a line number in a review on a customer reviews page;
establishing a third on-line shopping session based on the user identification; and
in response to the establishing of the third on-line shopping session and the one or more second trace attributes, causing display of the customer reviews page with a view focus at the indicated paragraph and line number.

15. The system of claim 14, wherein the causing of the display of the customer reviews page comprises:
determining, from the one or more second trace attributes, reviews on the customer reviews page accessed by a prior session associated with the user identification; and
modifying the customer reviews page to indicate that those reviews are accessed.

16. The system of claim 14, the operations further comprising:
receiving a request to establish the third on-line shopping session;
in response to the request, detecting the second on-line shopping session;
causing display, via the third on-line shopping session, of an option to select the second-line shopping session; and
causing display of a web page based on a selection of the second on-line shopping session.

17. A non-transitory computer readable storage medium comprising instructions that when executed configure hardware processing circuitry to perform operations comprising:
recording, via at least one hardware processor, in a course of an on-line shopping session associated with a user identification, one or more trace attributes indicative of activities of a user during the on-line shopping session, the one or more trace attributes comprising an attribute indicating a shopping cart web page that was last accessed via the on-line shopping session;

detecting, via the at least one hardware processor, a request from a client device to commence a second on-line shopping session associated with the user identification; and subsequent to an interruption of the on-line shopping session and in response to the detected request to commence the second on-line shopping session:

selecting, via the at least one hardware processor, the shopping cart web page based on the attribute indicating the shopping cart web page that was last accessed during the on-line shopping session, and causing display of the web page via the second on-line shopping session on the client device.

18. The non-transitory computer readable storage medium of claim 17, the operations further comprising recording one or more second trace attributes indicative of a focus area of the shopping cart web page, and setting, via the second on-line shopping session, a focus area of the shopping cart web page in accordance with the one or more second trace attributes.

19. The non-transitory computer readable storage medium of claim 17, the operations further comprising:

recording, via the second on-line shopping session, one or more second trace attributes indicative of a paragraph and a line number in a review on a customer reviews page;

establishing a third on-line shopping session based on the user identification; and in response to the establishing of the third on-line shopping session and the one or more second trace attributes, causing display of the customer reviews page with a view focus at the indicated paragraph and line number.

20. The non-transitory computer readable storage medium of claim 19, wherein the causing of the display of the customer reviews page comprises:

determining, from the one or more second trace attributes, reviews on the customer reviews page accessed by a prior session associated with the user identification; and modifying the customer reviews page to indicate that those reviews are accessed.

\* \* \* \* \*